(12) United States Patent
Colvin

(10) Patent No.: US 6,840,636 B1
(45) Date of Patent: Jan. 11, 2005

(54) SOLAR DIFFUSION LOSS COMPENSATOR AND COLLIMATOR

(76) Inventor: Carl R Colvin, 4526 25th Ave. South, Saint Petersburg, FL (US) 33711

( * ) Notice: Subject to any disclaimer, the term of this patent is extended or adjusted under 35 U.S.C. 154(b) by 44 days.

(21) Appl. No.: 10/435,742

(22) Filed: May 8, 2003

(51) Int. Cl.$^7$ .............................. G02B 27/00; F24J 2/10
(52) U.S. Cl. ....................... 359/613; 126/683; 136/206
(58) Field of Search ................................ 359/613, 601, 359/727, 729, 731, 850; 126/569, 683, 684; 136/246, 206

(56) References Cited

U.S. PATENT DOCUMENTS 6,415,783 B1 * 7/2002 Harrison ..................... 126/683
6,700,054 B2 * 3/2004 Cherney et al. ............ 136/246

* cited by examiner

*Primary Examiner*—Hung Xuan Dang
(74) *Attorney, Agent, or Firm*—Michael I. Kroll

(57) ABSTRACT

A solar diffusion loss compensator and collimator that reduces loss due to reflection of non-perpendicular energy rays that are usually reflected and lost externally by providing a means to capture reflected energy from adjacent surfaces and redirecting such energy toward the focal plane comprising a transparent, multi-tiered, hexagonal structure having a series of internal recesses that selectively reflect (total internal reflection [T.I.R]) the light waves passing therethrough thereby focusing and concentrating said light for the storage and usage thereof. A reflector assembly surrounds the solar collector assembly to redirect light towards the vertical planes of the solar collector. The present invention improves flux densities in radiant energy applications by gathering diffused light and redirecting the rays so they may be compressed into dense parallel rays and directionally focused to suit a particular applications.

11 Claims, 14 Drawing Sheets

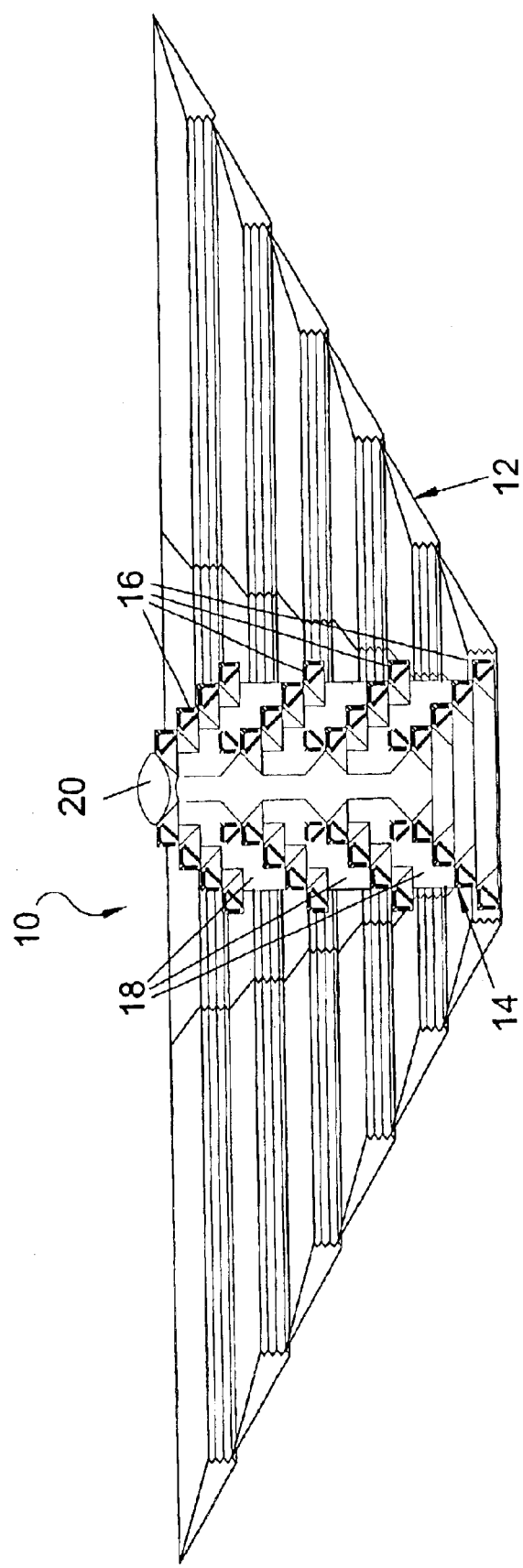

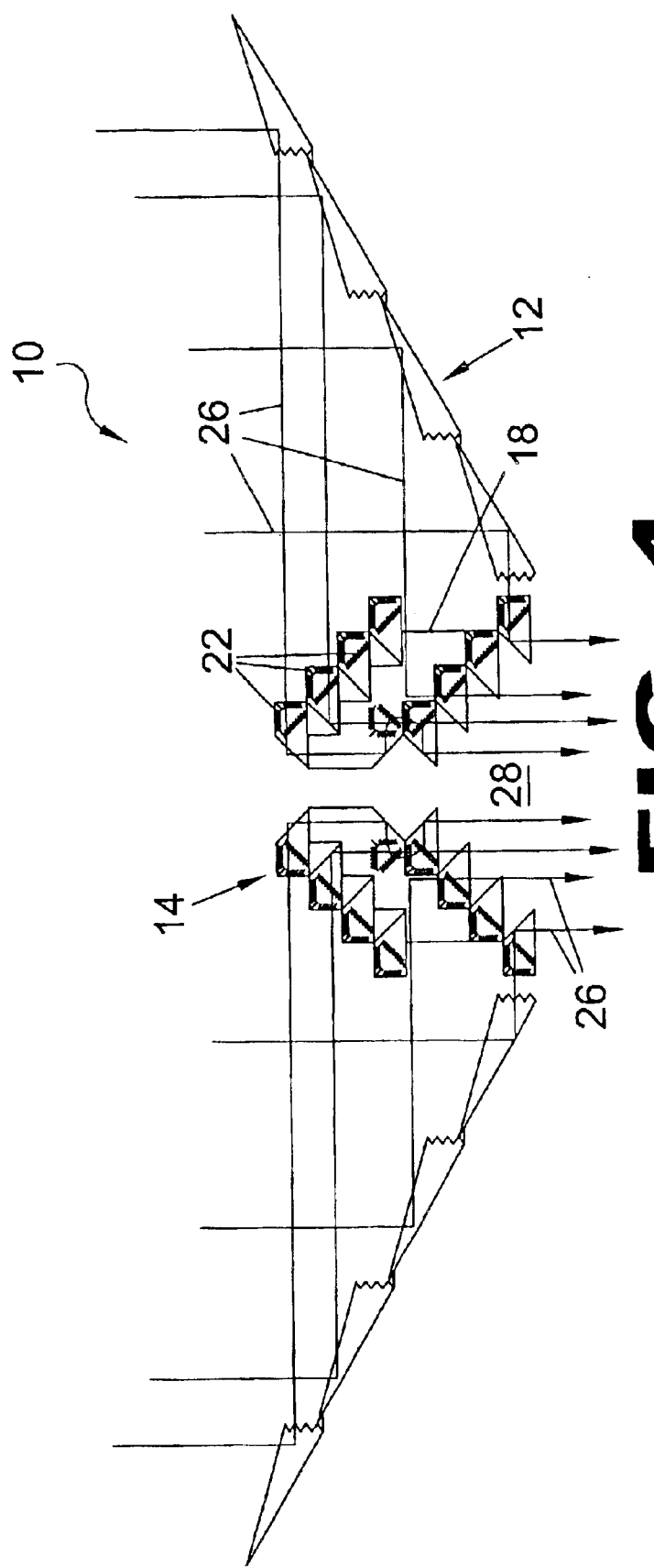

SOLAR DIFFUSION LOSS COMPENSATOR AND COLLIMATOR

BACKGROUND OF THE INVENTION

1. Field of the Invention

The present invention relates generally to solar collectors and, more specifically, to a solar diffusion loss compensator and collimator that reduces solar loss due to reflection of non-perpendicular energy rays that are usually reflected and lost externally by providing a means to capture reflected energy from adjacent surfaces and redirecting such energy toward the focal plane. This is achieved by providing a transparent, multi-tiered, hexagonal structure having a series of internal recesses that selectively reflects (total internal reflection [T.I.R.]) the light waves passing therethrough thereby effectively focusing and concentrating said light for the storage and usage thereof.

Another feature incorporated into this design, is the ability to conduct the incoming light energy internally toward the center of the assembly. The light then exits the underneath side and thereby enables a large nearly flat (flatness is defined usually via a term called "aspect ratio", in most concentrators that ratio is 1.5 to 0.7 or 0.5, this design allows for a ratio of 0.168 or less) surface area to be concentrated below the reflector area, which in turn will increase concentration values as well as allow for greater design flexibility when incorporated into an architectural plan.

A reflector assembly surrounds the solar collector assembly to redirect light towards the vertical planes of the solar collector. In essence the present invention improves flux densities in radiant energy applications by gathering direct and diffuse light and redirecting the rays so they may be compressed into dense parallel rays and directionally focused to suit a particular application.

2. Description of the Prior Art

There are other lens devices designed for optics. Typical of these is U.S Pat. No. 1,504,970 issued to Pascucci on Aug. 12, 1924.

Another patent was issued to Hofmann on Aug. 11, 1970 as U.S. Pat. No. 3,523,721. Yet another U.S. Pat. No. 4,069,812 was issued to O-Neill on Jan. 24, 1978 and still yet another was issued on Nov. 7, 1978 to Paul as U.S. Pat. No. 4,124,017.

Another patent was issued to Popovich et al. on Jul. 6, 1982 as U.S. Pat. No. 4,337,759. Yet another U.S. Pat. No. 4,711,972 was issued to O-Neill on Dec. 8, 1987. Another was issued to Appeldorn on Jul. 18, 1989 as U.S Pat. No. 4,848,319 and still yet another was issued on Oct. 26, 1993 to Curchod as U.S Pat. No. 5,255,666.

Another patent was issued to Whitehead on Aug. 16, 1994 as U.S. Pat. No. 5,339,382. Yet another U.S. Pat. No. 5,936,777 was issued to Dempewolf on Aug. 10, 1999. Another was issued to Fairbanks et al. on Jul. 18, 2000 as U.S. Pat. No. 6,091,020 and still yet another was issued on Dec. 26, 2000 to Lloyd as U.S. Pat. No. 6,164,786.

U.S. Pat. No. 1,504,970

Inventor: Emilio Pascucci

Issued: Aug. 12, 1924

The invention discloses a fresnel lens having on one face concentric zones united by miters, the miters being undercut, whereby they will be parallel to the path of the rays passing through the lens.

U.S. Pat. No. 3,523,721

Inventor: Christian Hofmann

Issued: Aug. 11, 1970

Disclosed is a spherically corrected Fresnel with partial field correction, comprising two optical effective faces whose curvatures in the meridional plane are determined by a predetermined formula and a Fresnel system on one of said faces, said fresnel system consisting of echelons, each of said echelons having an effective and a disturbing non-imaging flank.

U.S. Pat. No. 4,069,812

Inventor: Mark J. O-Neill

Issued: Jan. 24, 1978

A curved prismatic, Fresnel-type lens primarily used for concentrating sunlight in a solar energy collector. The lens comprises a substantially smooth, convex outer surface and a plurality of prisms arranged side-by-side along a curve on the inner surface to direct incoming light to a common area. Each of the individual prisms has a front and back face joined by a bottom face. The front and back faces of the prisms are oriented such that the angle of incidence of the incoming light with the front face is equal to the angle of incidence of the outgoing light with the back face. Further, each of the prisms is arranged along the curve such that they do not obstruct light passing through any adjacent prism. The bottom face of each prism is over-extended beyond the path of the light passing through the prism to prevent loss of light due to blockage by the bottom face or the rounded point between the back face and bottom face. The improved lens is used in combination with a solar energy collector comprising the improved concentrator and a suitable energy receiver for converting incident sunlight into a useful energy output.

U.S. Pat. No. 4,124,017

Inventor: James B. Paull

Issued: Nov. 7, 1978

This invention describes an improved solar energy collector which passively concentrates the rays of the sun. The collector comprises a transparent cover which collimates incident rays of light and directs such collimated sunlight towards an absorbing target wherein the radiation's energy is received and utilized. The transparent collector cover consists of a lamination of transparent plastic or glass elements. Sunlight incident on the cover over a range of angles is reflected internally between the sides of the elements. These elements are so shaped that internal reflections result in the sunlight becoming collimated. Specifically, the elements are curved so that the horizontal distance between the sides of adjacent elements remains constant whereas the length of a normal between the sides increases along the path of incident light. The effect of these apparently diverging surfaces is to cause each subsequent internal reflection at a particular internal surface to occur at a successively lower angle of incidence, thus tending to collimate the light's rays. The resulting collimated rays are then reflected upon leaving the bottom of the collector cover in such a way that they are directed towards the absorbing target.

U.S. Pat. No. 4,337,759

Inventor: Joseph M. Popovich

Issued: Jul. 6, 1982

A radiant energy redirecting system comprises: (a) a radiant energy transmitting body means, (b) said means comprising multiple elements, each of which acts as a radiant energy redirecting module, having on its cross-sectional perimeter an entry face to receive incidence of said energy into the interior of said perimeter, an exit face to pass said energy to the exterior of said perimeter in a direction towards the reverse side of the body from the side of said incidence, and a Totally Internally Reflecting face angled relative to said entry and exit faces to redirect towards said exit face the radiant energy incident from said entry face, 8 said body means generally redirecting incident radiant energy towards a predetermined target zone situated apart from and on the reverse side of said body relative to the side of said incidence.

U.S. Pat. No. 4,711,972

Inventor: Mark J. O-Neill

Issued: Dec. 8, 1987

A solar energy collector including a primary optical concentrator, one or more solar cells and an improved solar cell cover design is provided. Each of the solar cells includes a flexible cell cover which significantly reduces optical losses due to gridline obscuration of active cell area and also due to reflection from the cover itself. The cover comprises an optically clear, flexible material, such as a silicone polymer, placed over the illuminated surface of each solar cell, with prisms formed on the outer surface of the cover such that incident sunlight is refracted by the prisms onto active cell area rather than partially onto non-active gridlines or conducting elements. Each of the prisms has a predetermined shape depending on the type of primary optical concentrator used in the solar energy collector.

U.S. Pat. No. 5,255,666

Inventor: Donald B. Curchod

Issued: Oct. 26, 1993

A solar energy concentrator including a thin flexible Fresnel lens for focusing incident solar radiation not normal to the lens onto a target area by refraction. The Fresnel lens is supported or suspended above the target area by a frame and folded along at least one line or region parallel to the refractive prisms of the lens which are generally parallel to the axis of the target area whereby the Fresnel lens opens toward the target area. Thus the Fresnel lens is so positioned so as to allow it to bow and flex under wind loads, gravity and other environmental factors without causing significant deterioration in the efficiency of the system.

U.S. Pat. No. 4,848,319

Inventor: Roger H. Appeldorn

Issued: Jul. 18, 1989

A solar electric conversion unit and system includes substantially increased efficiency with reduced losses and increased acceptance angles. The system employs a short focal length fresnel lens extruded to further include depending side walls. The free edges of the sides carry a heat sink supporting a photovoltaic cell. The extruded side walls function as light pipes for carrying light directly to the photovoltaic cell. The walls are reflective inwardly of the unit to further avoid loss of stray light.

U.S. Pat. No. 5,339,382

Inventor: Lorne A. Whitehead

Issued: Aug. 16, 1994

A prism light guide luminaire has opaque and light emitting surface portions which together form a selected cross-sectional configuration. The opaque surface portion has a light reflecting characteristic. The light emitting surface portion is prism light guide material which confines, within the luminaire, light rays which strike the material at angles falling within the material's acceptance angular range. Within the luminaire, a light scattering area having a predefined shape and location redirects light into angles falling outside the material's acceptance angular range. The luminaire's cross-sectional configuration, the opaque surface portion's light reflecting characteristic, and the shape and location of the light scattering area are selected such that (i) light redirected by the light scattering area which does not pass directly from the scattering area to the light emitting surface portion and escape through that portion is substantially efficiently reflected by the prismatic material directly back onto the scattering area; and, (ii) all paths along which light may pass directly from the scattering area to the light emitting surface portion define a solid angle less than 2.pi.

U.S. Pat. No. 5,936,777

Inventor: Joseph P. Dempewolf

Issued: Aug. 10, 1999

An optical is provided that comprises a single lens component, comprising two axially-graded index of refraction elements, each having a low refractive index surface and a high refractive index surface and joined along their respective high refractive index surfaces. As configured, the optical coupler is useful as a solar concentrator for concentrating solar radiation onto a solar cell or other solar-receptive medium.

U.S. Pat. No. 6,091,020

Inventor: Eugene S. Fairbanks et al.

Issued: Jul. 18, 2000

A concentrating coverglass allows, efficient power generation for providing higher specific powers by space power arrays with weight penalties being countered by combining the functions of a solar concentrator and protective coverglass into a single element. A preferred frustoconical lens achieves a concentration ratio of about 4.5 at a thickness of about 1.0 mm. Efficient space power arrays with relatively wide tracking angle tolerance of up to about .+-.5.degree. using these coverglasses permit heavier payloads in the satellite's operating systems over traditional satellite designs.

U.S. Pat. No. 6,164,786

Inventor: Beverly Lloyd

Issued: Dec. 26, 2000

An array of concentrators of electromagnetic radiation (i.e., visible light, radio waves, etc.) employing one or more concentrating devices. Each concentrating device includes: a concentrator system for concentrating the incident electromagnetic radiation impinging thereon; a collimator system disposed in the path of electromagnetic radiation from the concentrator system for producing a beam of electromagnetic radiation; and a redirecting system. Each concentrating device has one or more of its elements staggered such that the beams from the array of concentrating devices result in a stacked or bundled plurality of beams. This bundle of beams is then concentrated again, recollimated and redirected to join with other similarly concentrated beams. This arraying can be repeated again and again, producing stronger and stronger beams or electromagnetic radiation, if desired.

While these solar devices may be suitable for the purposes for which they were designed, they would not be as suitable for the purposes of the present invention, as hereinafter described.

SUMMARY OF THE PRESENT INVENTION

A primary object of the present invention is to provide a solar collector that reduces loss due to reflection of non-perpendicular energy rays.

Another object of the present invention is to provide a solar collector having a reflector assembly surrounding the solar collector assembly.

Yet another object of the present invention is to provide a solar collector having means for channeling light rays.

Still yet another object of the present invention is to provide a solar collector having a reflector assembly with a plurality of predetermined angled cavities for directing light waves into the solar collector assembly.

Another object of the present invention is to provide a solar collector wherein several planes of radiant energy can be collimated for further processing.

Yet another object of the present invention is to provide a solar collector which overcomes the shortcomings of the prior art.

Still yet another object of the present invention is to provide a solar collector that is cost effective to manufacture.

Additional objects of the present invention will appear as the description proceeds.

The present invention overcomes the shortcomings of the prior art by providing a solar diffusion loss compensator and collimator that reduces loss due to reflection of non-perpendicular energy rays that are usually reflected and lost. A means is provided to capture reflected energy from adjacent surfaces and redirect such energy toward the focal plane. The device is a transparent, multi-tiered, hexagonal structure having a series of internal recesses that reflect (T.I.R.) the light waves effectively focusing and concentrating them for further application. A reflector assembly surrounds the solar collector assembly to redirect light towards the vertical planes of the solar collector. The present invention improves flux densities in radiant energy applications by gathering direct and diffuse light and redirecting the rays into dense parallel rays directionally focused to suit a particular application.

The foregoing and other objects and advantages will appear from the description of follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 1 is a sectional view of the present invention;

DESCRIPTION OF THE REFERENCED NUMERALS

Figure 1A:
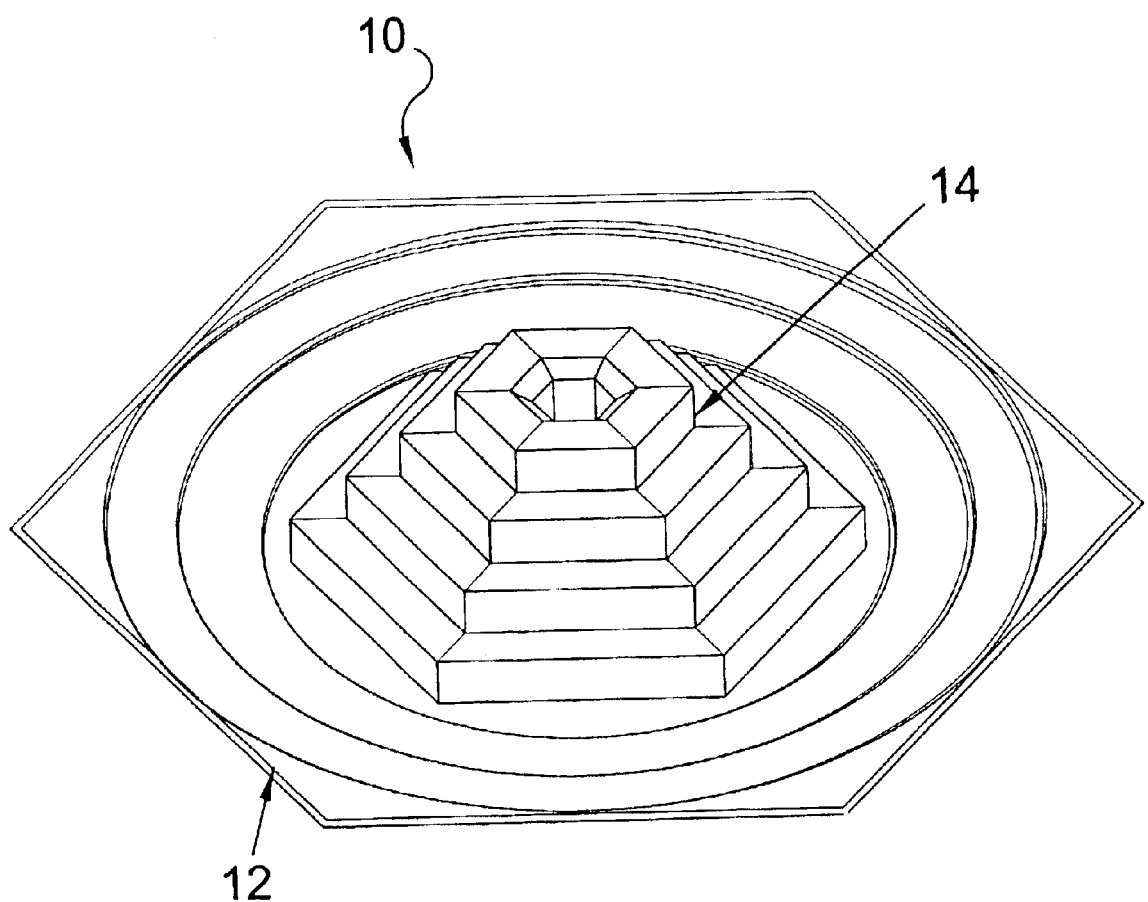
FIG. 1A is a perspective view of the collector assembly and its associated reflector assembly.

Turning now descriptively to the drawings, in which similar reference characters denote similar elements throughout the several views, the figures illustrate the Solar Diffusion Loss Compensator and Collimator of the present invention. With regard to the reference numerals used, the following numbering is used throughout the various drawing figures.

10 Solar Diffusion Loss Compensator and Collimator of the present invention
12 reflector assembly
13 reflector module
14 collector assembly
16 collector layer
18 collector link
20 center compression lens
22 reflecting elements of 16
24 concave alignment lens of 20
26 light waves
28 collimator shaft
30 vertical face of 16
32 horizontal face of 16
34 first reflection element
36 second reflection element
38 solar collector array

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is a sectional view of the present invention 10. The present invention 10 is a solar diffusion loss compensator and collimator 10 that reduces loss due to reflection of non-perpendicular energy rays 26 that are usually reflected and lost externally by providing a means to capture reflected energy from adjacent surfaces and redirecting such energy toward the focal plane. This is achieved by providing a transparent, multi-tiered, hexagonal structure 14 having a series of internal recesses 22 that selectively reflect (T.I.R) the light waves 26 passing therethrough thereby effectively focusing and concentrating said light 24 for the storage and usage thereof. A reflector assembly 12 surrounds the solar collector assembly 14 to redirect light 26 towards the vertical planes 30 of the solar collector 14. In essence the present invention improves flux densities in radiant energy applications by gathering diffused light 26 and redirecting the rays so they may be compressed into dense parallel rays and directionally focused to suit a particular application. Collector links 18 are used to form a continuous link between collector layers 16 to create a stack.

FIG. 1A is a perspective side view of a collector assembly 14 and its associated reflector assembly 13. Shown is the reflector assembly 12 having a substantially circular shape to harvest and direct radiant light 26 towards the collector assembly 14 where it is reflected and focused into a concentrated beam along with the light gathered directly by the collector assembly 14.

Figure 1B:
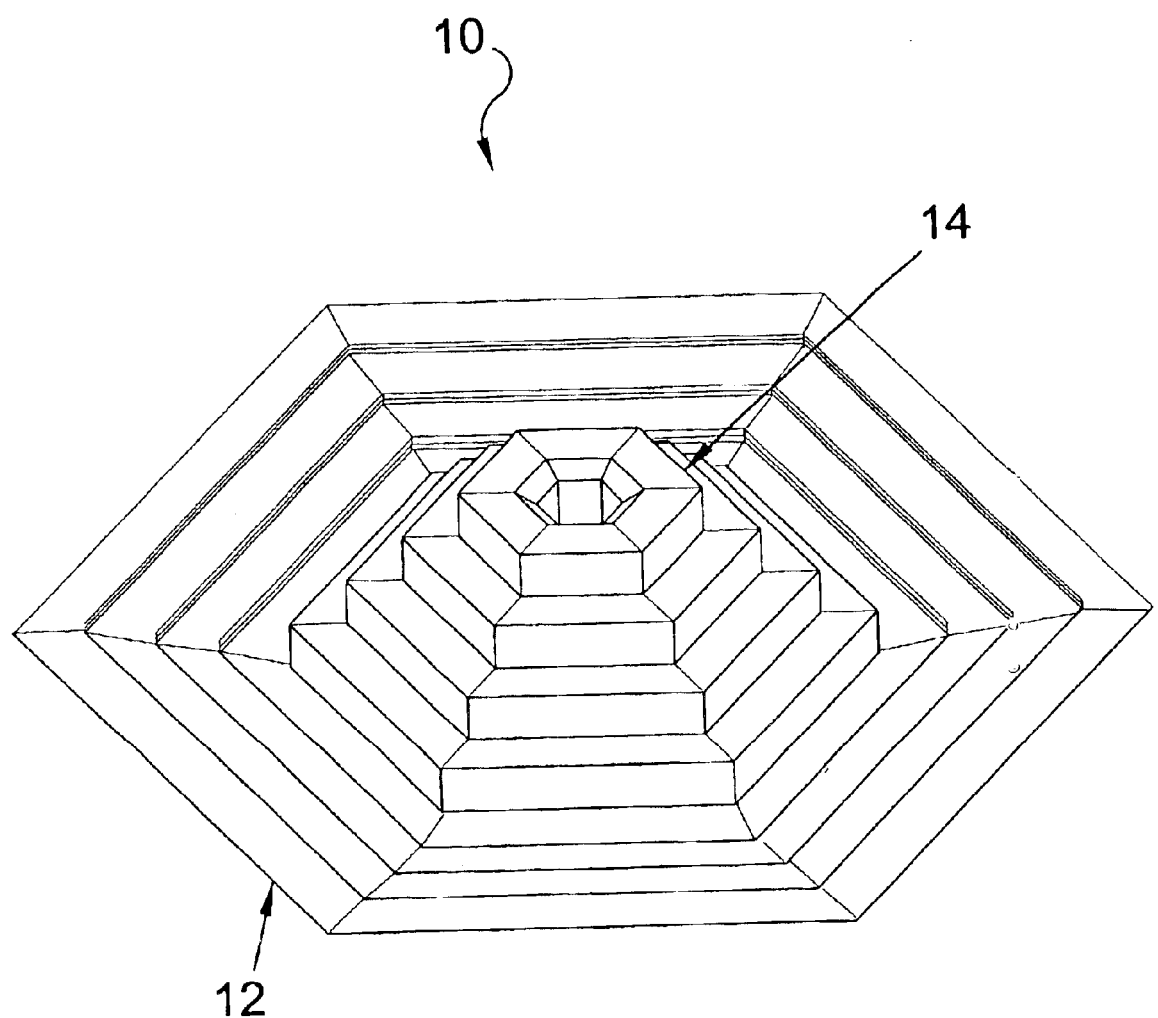
FIG. 1B is a perspective view of the collector assembly and its associated reflector assembly.

FIG. 1B is a perspective side view of a collector assembly 14 and its associated reflector assembly 12. Shown is the preferred configuration of the reflector assembly 12 having a polygonal shape corresponding with that of the collector assembly 14.

Figure 2A:
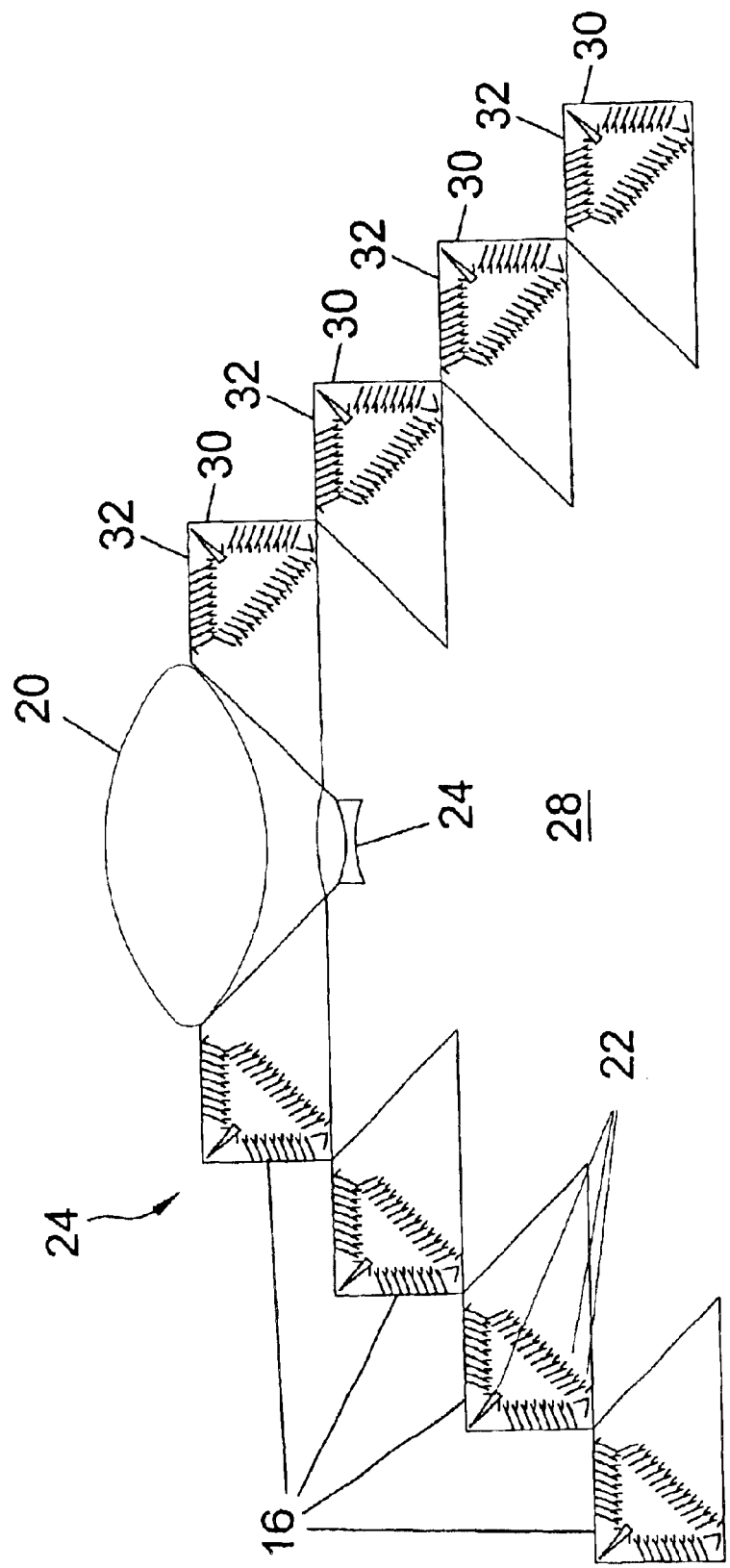
FIG. 2A is a diagrammatic view of the refracting elements of the collector assembly.

FIG. 2A is a diagrammatic view of the reflecting elements 22 of the collector assembly 14. FIG. 2a is a diagrammatic view demonstrating the configuration of the reflecting elements 22 as they reside within the collector assembly 14.

Figure 2B:
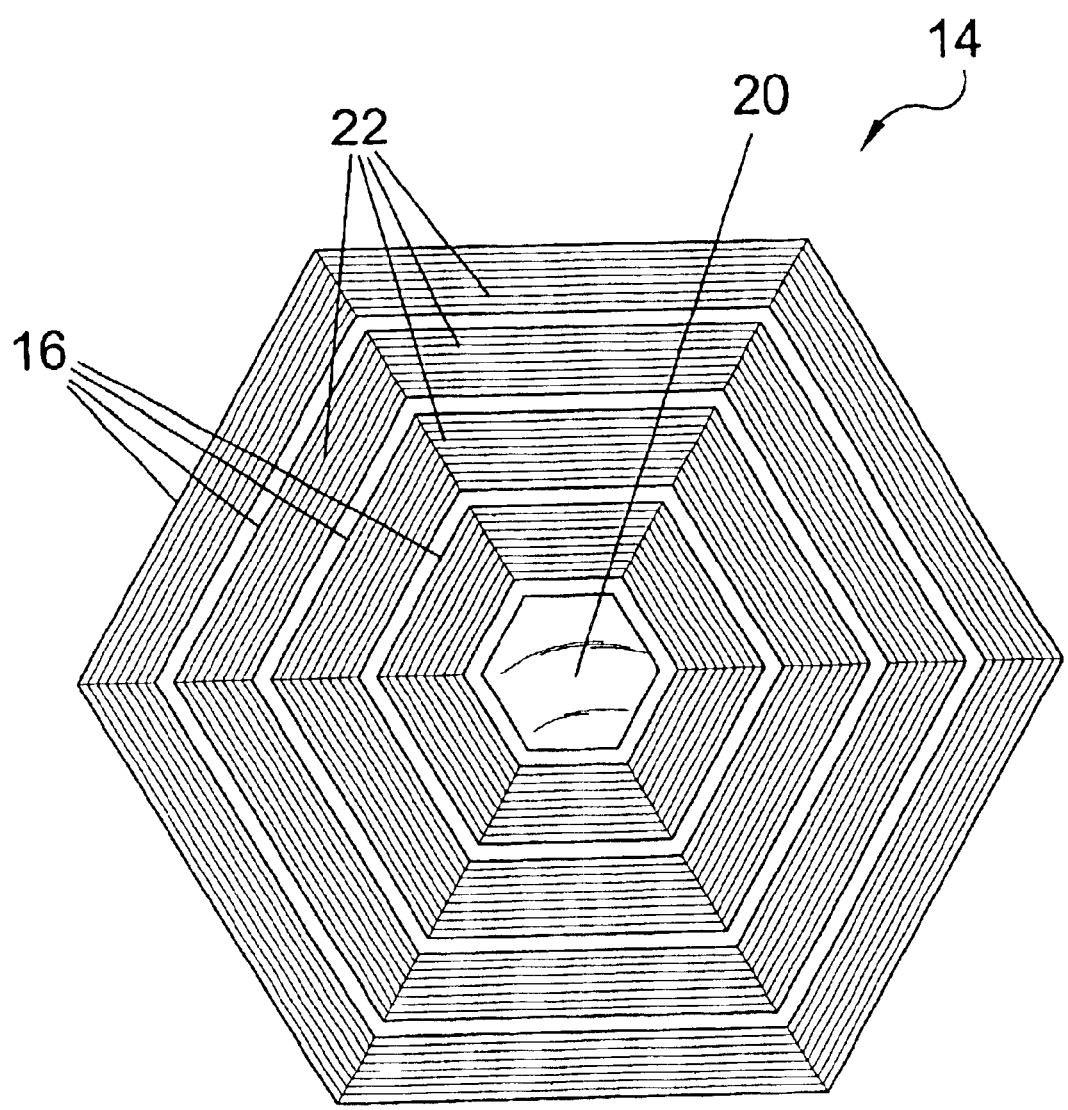
FIG. 2B is a top view of the collector assembly.

FIG. 2B is a top view of the collector assembly 14. Shown are the reflecting elements 22 of the collector assembly 14 as they traverse the collector assembly 14.

Figure 3:
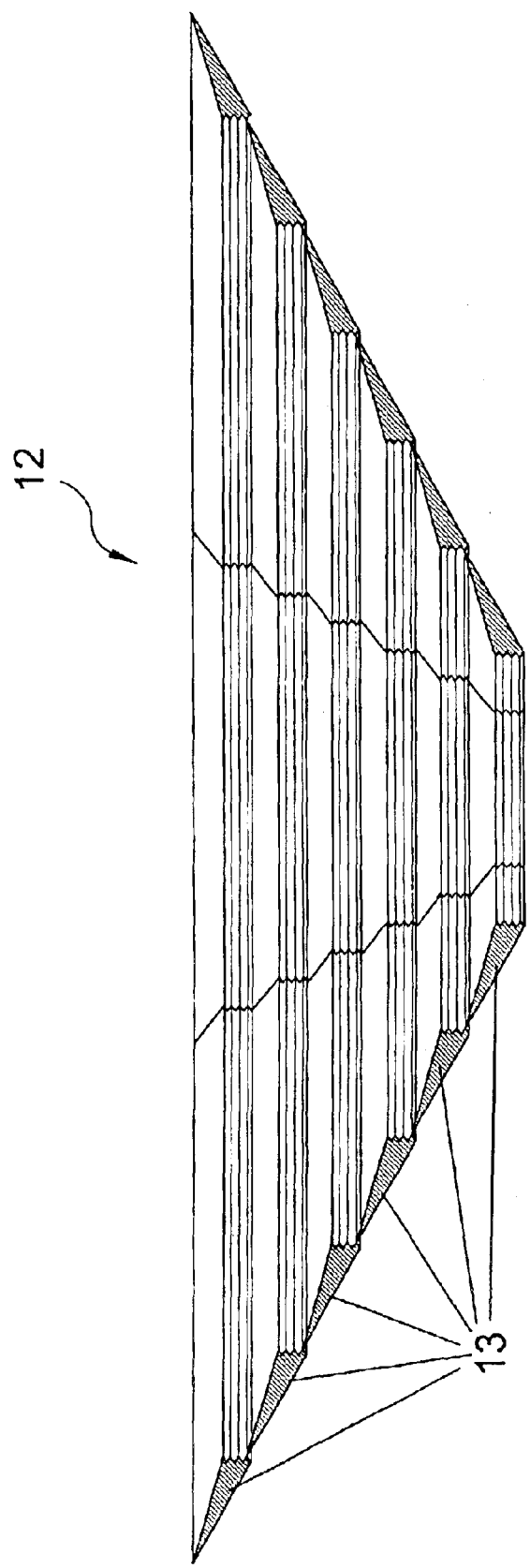
FIG. 3 is sectional side view of the present invention.

FIG. 3 is sectional side view of the reflector assembly 12. Shown is the reflector assembly 13 of the present invention 10. The reflector assembly 12 is designed to refract and reflect solar rays 26 that are gathered by the surface thereof and redirect them to the surface of the centrally positioned solar collector assembly 14.

Figure 4A:
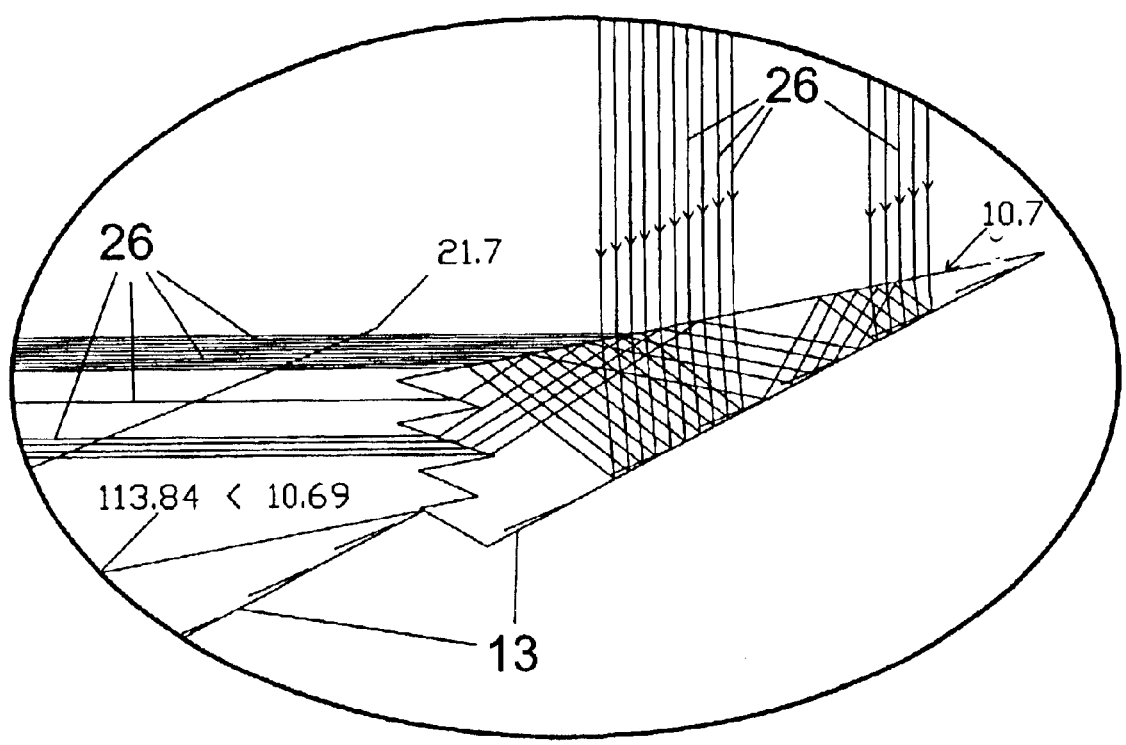
FIG. 4 is a diagrammatic side view of the light path through a collector/reflector assembly.

FIG. 4 is a diagrammatic side view of the light path 26 through a reflector assembly 12 and collector assembly 14. The two separate energy paths are combined by the internal diagonal compression and reflection elements 22 so that the radiant energy is conducted in such a way that the combined rays 26 exit the base surface below a 45-degree angle. The base surface then emits the combined light energy perpendicular to the assembly layer.

Figure 5:
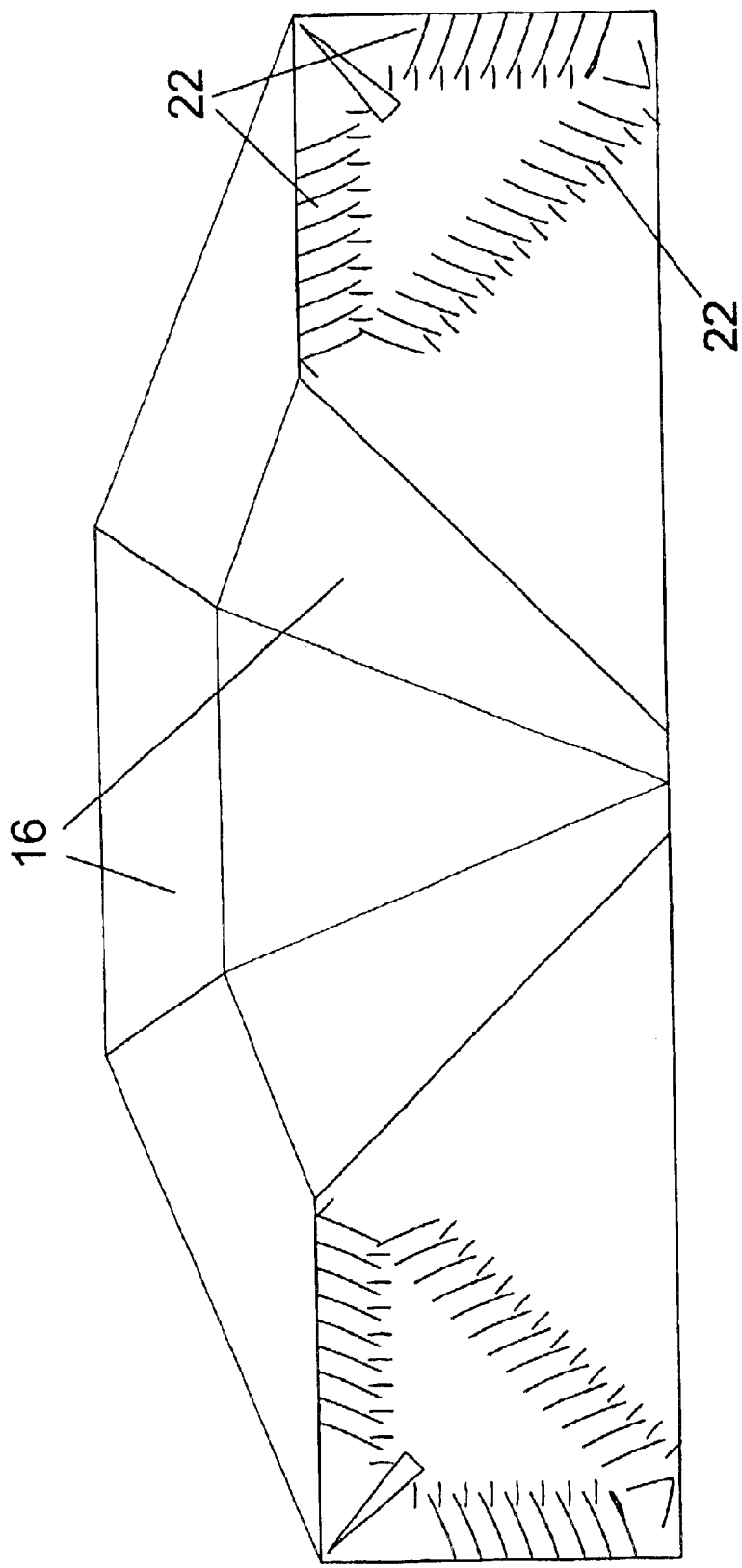
FIG. 5 is an enlarged sectional view of a central core.

FIG. 5 is enlarged sectional view of a central core of the collector assembly 14. Shown are the three orientations of the reflecting elements 22 in relation to the task at each position.

Figure 6:
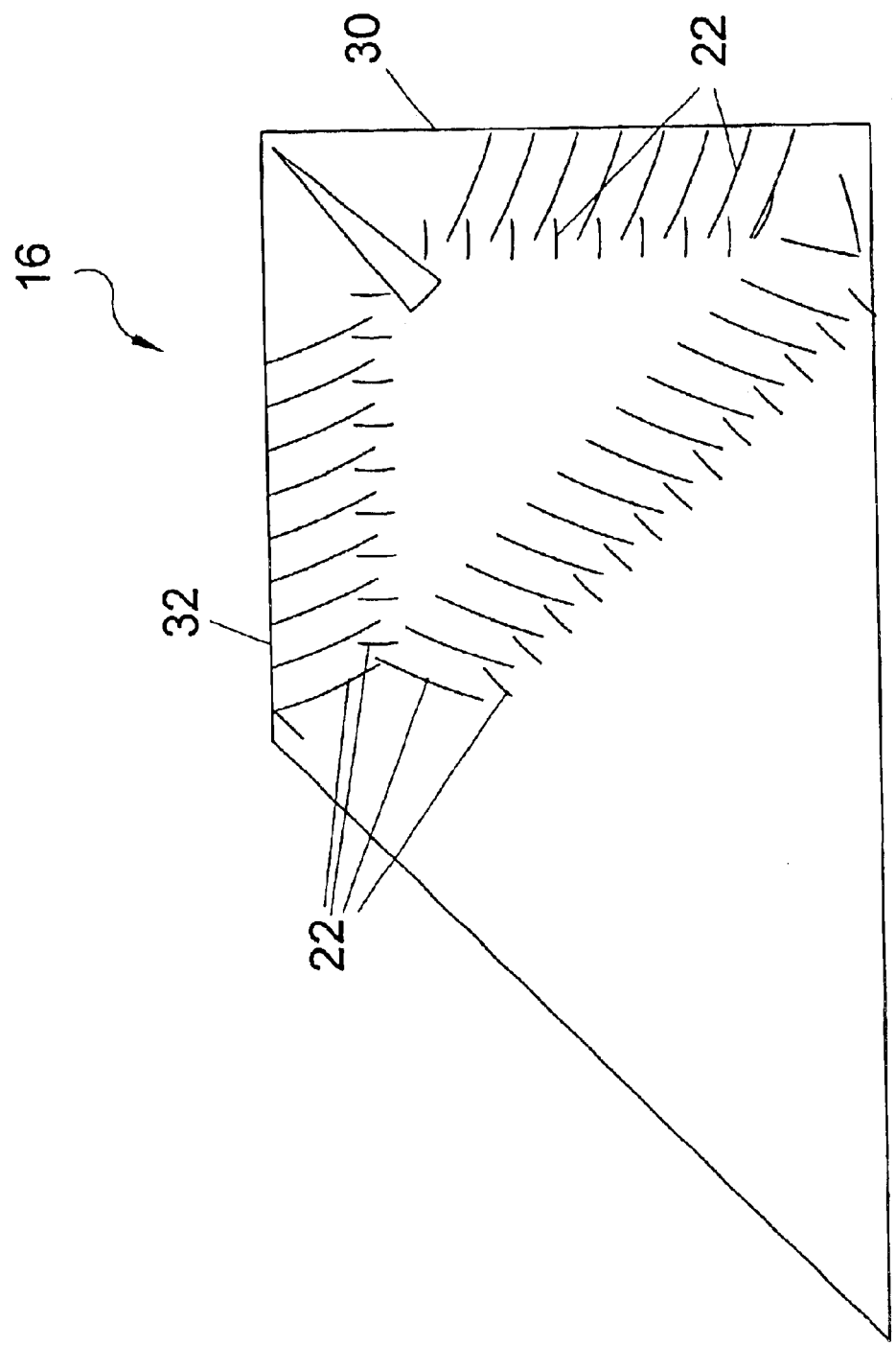
FIG. 6 is sectional side view of an assembly layer.

FIG. 6 is sectional side view of a collector layer 16. Shown are the relationships of the reflection elements 22 to one another and their position relative to their respective entry surfaces. Also shown is the contiguous nature of the element surfaces as these extend through the assembly to conduct and compress the energy with efficient use of the same design element. The increase in flux density within a given area provides an increase in energy density due to the added resources of other ray angles added together that would normally be lost. The resultant energy available is non-focusing but collimated into a non-converging beam without the use of further corrective lenses. Converging systems would also benefit from having a greater flux density to start with.

Figure 7:
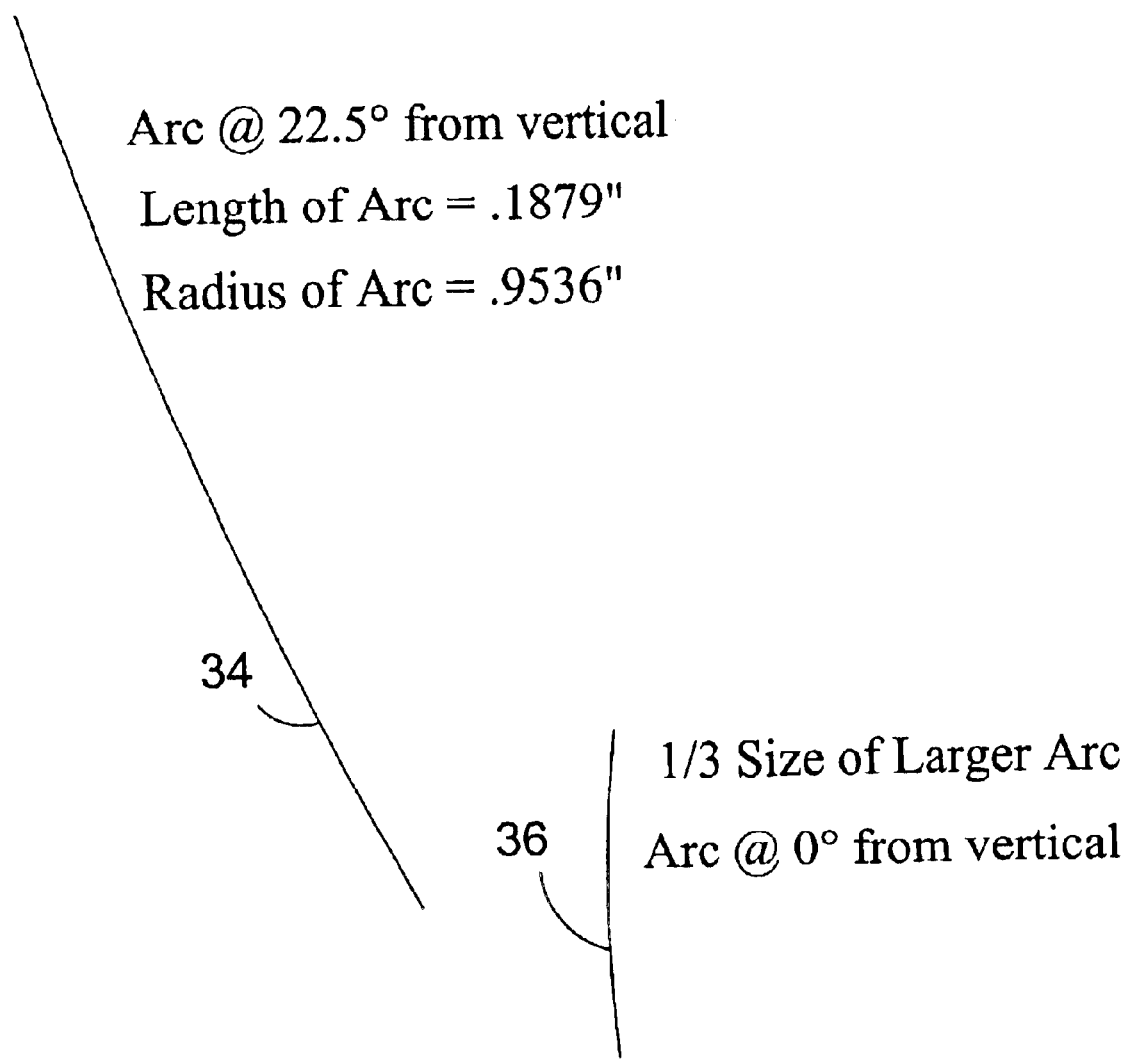
FIG. 7 is side view of the reflective element.

FIG. 7 is side view of the reflection element 22. Shown is the design for all of the reflection elements 22 used in the present invention 10. The light energy 26 will approach each element at an angle of 22.5 degrees relative to the refractive surface.

Figure 8:
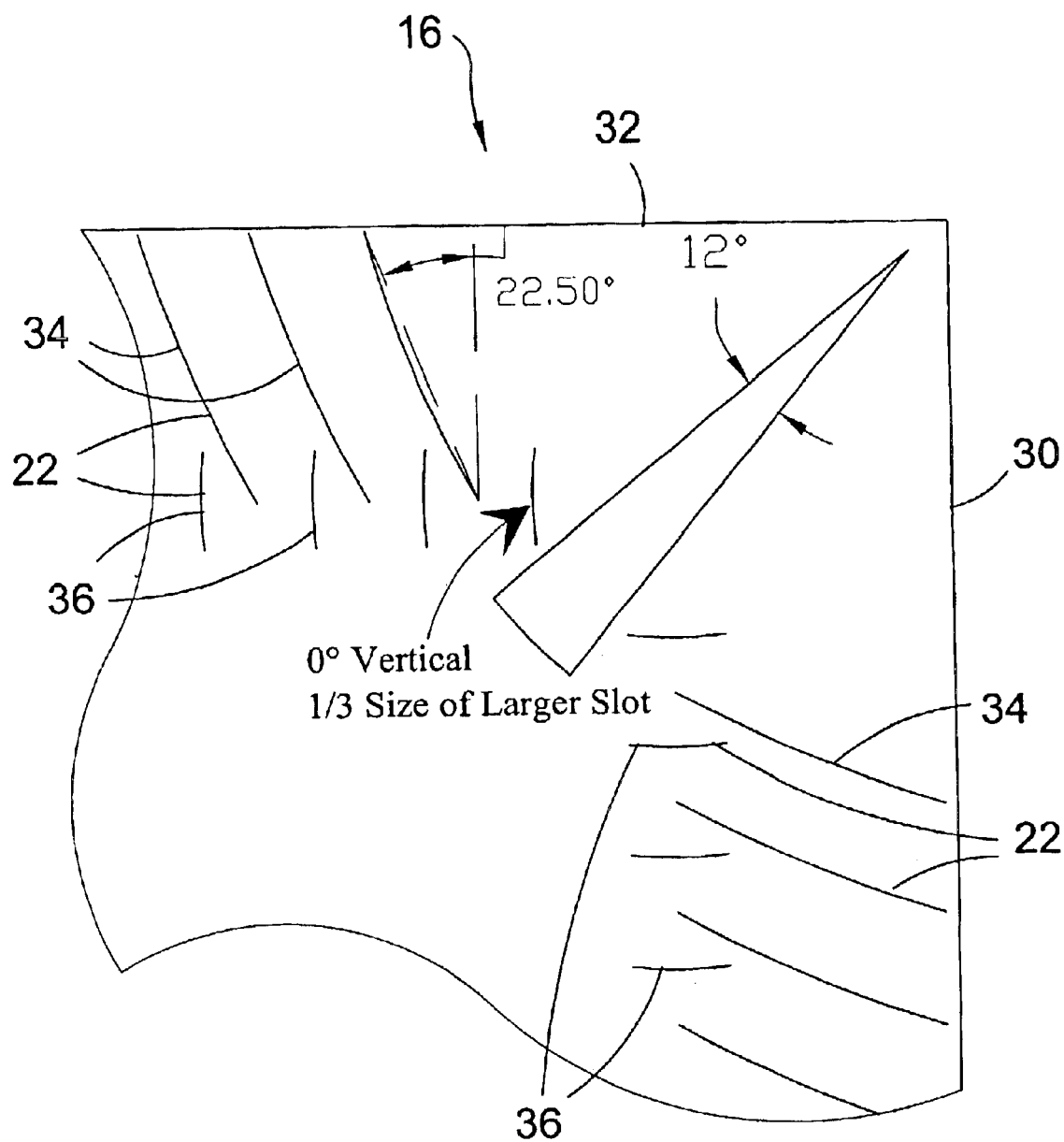
FIG. 8 is side view of the refraction element.

FIG. 8 is side view of the reflecting elements 22. The reflecting elements 22 of the present invention 10 are a series of air cavities as defined by the transparent media. The light paths of rays 26 that strike the horizontal 32 or vertical planes 30 of the collector assembly 14 are manipulated as they reflect due to the surfaces thereof by said air cavities and reflect internally in the transparent media until such time that all light rays 26 are parallel and traveling in a uniform direction.

Figure 9:
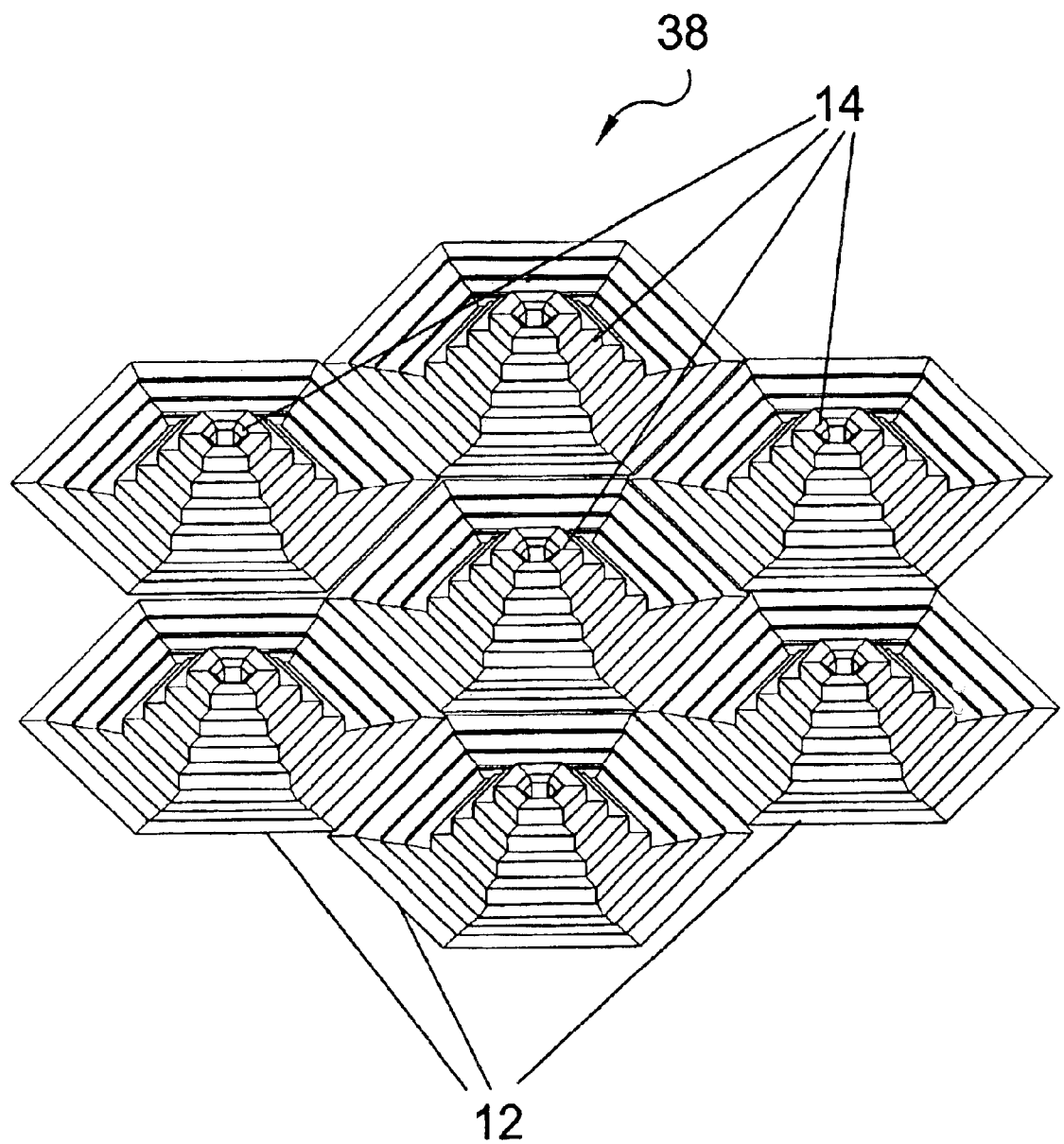
FIG. 9 is a perspective view of a solar collector assembly array.

FIG. 9 is a perspective view of a solar collector assembly array 38. Shown is a plurality of solar collectors 14 and their respective reflector assemblies 12 abutted to one another in edge-to-edge fashion thereby providing maximum coverage of a given area for effective harvesting of solar rays 26. An assembly of this type may have multiple transducers (i. e., individual solar cells at center or may be linked together for a combined light input into a single transducer).

Figure 10:
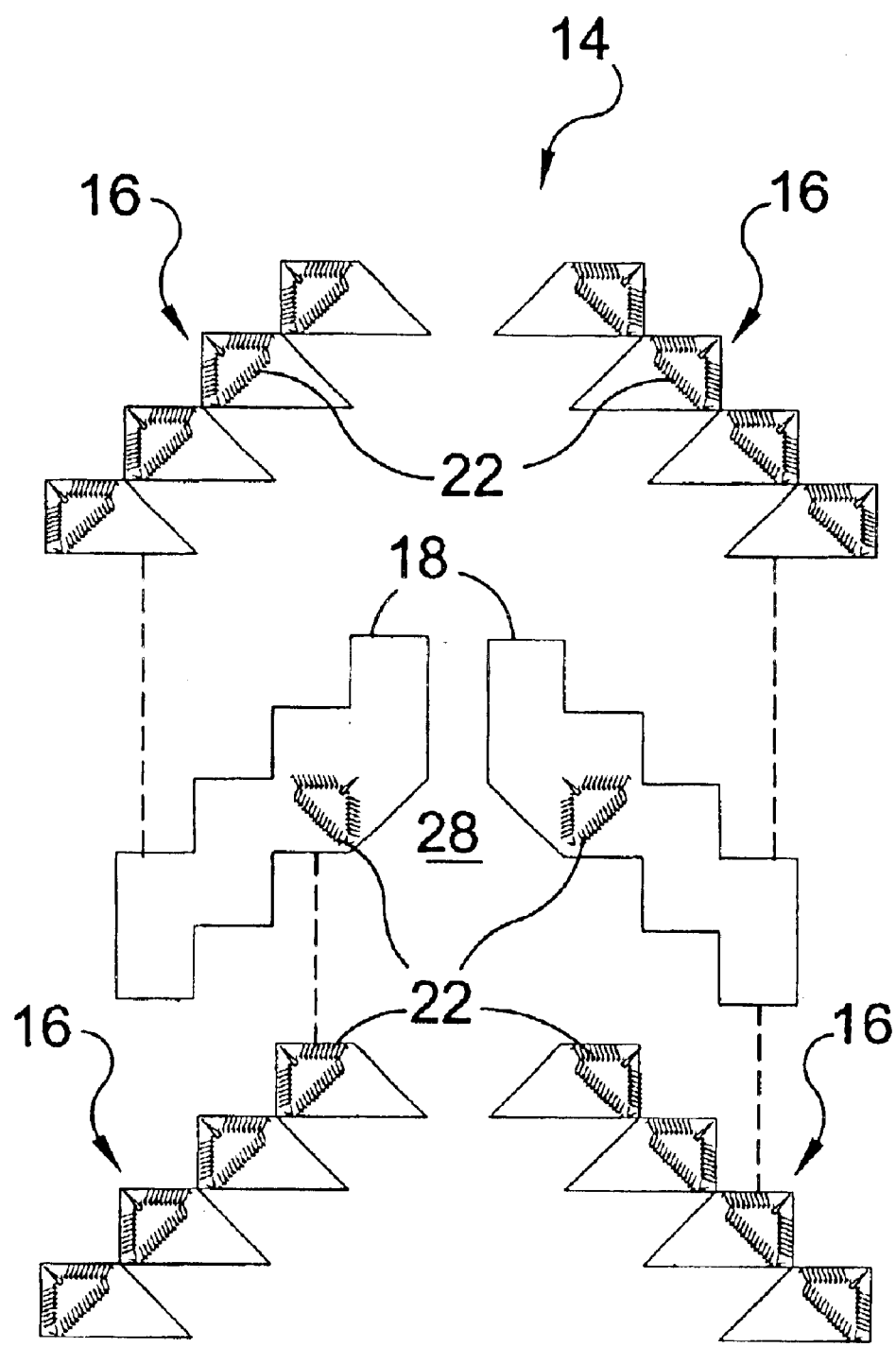
FIG. 10 is a partial exploded view of the collector assembly.

FIG. 10 is a partial exploded view of a collector assembly 14. Shown are two collector layers 16 and a connector link 18 that are used to create a continuous stack for redirecting the concentrated light rays 26.

What is claimed as new and desired to be protected by Letters Patent is set forth in the appended claims:

1. A solar diffusion loss compensator and collimator comprising:
   a) means for reflecting and redirecting ambient light towards a central location in a substantially horizontal plane; and
   b) means for collecting, reflecting and concentrating ambient and reflected light with said collecting means centrally disposed with regard to said reflecting means.

2. A solar diffusion loss compensator and collimator as recited in claim 1, wherein said reflecting means is a reflector assembly comprising a plurality of multi-tiered prismatic reflector modules peripherally surrounding said collecting means with said prismatic plates angled and cut to refract the ambient light in a substantially horizontal plane towards said collecting means.

3. A solar diffusion loss compensator and collimator as recited in claim 1, wherein said collecting means is a collector assembly comprising:
   a) a plurality of united hexagonal collector layers comprised of a transparent media and arranged in a multi-tiered, step-like configuration thereby defining a plurality of external vertical and horizontal faces and a hollow internal collimator shaft;
   b) a plurality of angular recesses formed longitudinally within said collector layers proximal to said vertical and horizontal faces forming reflecting elements for precisely redirecting collected light as it passes through the surfaces thereof;

c) a center compression lens capping the open top portion of said collimator shaft comprising a convex upper portion tapering to a narrow underside, said compression lens serves to gather and concentrate ambient light waves; and d) a concave alignment lens disposed on the narrow underside of said compression lens to perpendicularly align the light waves upon entry into said collimator shaft.

4. A solar diffusion loss compensator and collimator as recited in claim 3, wherein said reflection elements are paired up with a first set of reflection elements and a second set of reflection elements that work in conjunction with one another and with the exterior surfaces of the transparent media to manipulate the light waves passing therethrough.

5. A solar diffusion loss compensator and collimator as recited in claim 4, wherein each collector layer has three pairs of reflection elements laid out in a substantially triangular configuration when view in cross section.

6. A solar diffusion loss compensator and collimator as recited in claim 4, wherein each reflection element in said first set of reflection elements has an arc at 22.5 degrees from vertical, the length of said arc being 0.1879" and the radius of the arc equaling 0.9536".

7. A solar diffusion loss compensator and collimator as recited in claim 3, wherein each reflection element in said second set of reflection elements has an arc at 0 degrees from vertical and $\frac{1}{3}$ the size of the arc of those of the first set of reflection elements.

8. A solar diffusion loss compensator and collimator as recited in claim 1, wherein said collecting means further includes a plurality of collector assemblies stacked one above the other.

9. A solar diffusion loss compensator and collimator as recited in claim 8, wherein said stacked collector assemblies are joined together by a plurality of step-shaped connector links.

10. A solar diffusion loss compensator and collimator as recited in claim 9, wherein said connector links include a plurality of internal recesses extending substantially the length thereof forming reflection elements to provide the controlled transmission of light waves from one connector assembly to a lower one.

11. A solar diffusion loss compensator and collimator as recited in claim 1, wherein a plurality of collecting means and their respective reflecting means may be installed adjacent to one another in order to effectively harvest the maximum amount of potential solar energy in a given area.

* * * * *